US 12,492,985 B2

(12) United States Patent
Nagase et al.

(10) Patent No.: US 12,492,985 B2
(45) Date of Patent: Dec. 9, 2025

(54) DENSITY MEASUREMENT DEVICE

(71) Applicant: FUJIKIN INCORPORATED, Osaka (JP)

(72) Inventors: Masaaki Nagase, Osaka (JP); Hidekazu Ishii, Osaka (JP); Kosuke Sugimoto, Osaka (JP); Takashi Fukawa, Yokohama (JP); Wataru Ashino, Yokohama (JP)

(73) Assignee: FUJIKIN INCORPORATED, Osaka (JP)

( * ) Notice: Subject to any disclaimer, the term of this patent is extended or adjusted under 35 U.S.C. 154(b) by 59 days.

(21) Appl. No.: 18/568,691

(22) PCT Filed: Jun. 29, 2022

(86) PCT No.: PCT/JP2022/026037
§ 371 (c)(1),
(2) Date: Dec. 8, 2023

(87) PCT Pub. No.: WO2023/013314
PCT Pub. Date: Feb. 9, 2023

(65) Prior Publication Data
US 2024/0288361 A1 Aug. 29, 2024

(30) Foreign Application Priority Data
Jul. 31, 2021 (JP) .................. 2021-126348

(51) Int. Cl.
*G01N 21/31* (2006.01)
*G01N 21/03* (2006.01)
(Continued)

(52) U.S. Cl.
CPC ......... *G01N 21/31* (2013.01); *G01N 21/0303* (2013.01); *G01N 21/255* (2013.01);
(Continued)

(58) Field of Classification Search
CPC ... G01N 2021/8578; G01N 2201/0638; G01N 21/05; G01N 21/27; G01N 21/3504; G01N 21/33
(Continued)

(56) References Cited

U.S. PATENT DOCUMENTS

2003/0053501 A1    3/2003  Sekiya et al.
2005/0200848 A1    9/2005  Levine et al.
(Continued)

FOREIGN PATENT DOCUMENTS

EP    1540310 A2 *  6/2005  ......... G01N 15/1459
JP    2000275008 A *  10/2000
(Continued)

OTHER PUBLICATIONS

International Search Report issued in PCT/JP2022/026037; mailed Aug. 16, 2022.

*Primary Examiner* — Md M Rahman
(74) *Attorney, Agent, or Firm* — Studebaker Brackett PLLC

(57) ABSTRACT

Provided is a concentration measurement device that can be miniaturized without using an optical fiber. The concentration measurement device including a measurement cell having a gas flow path and an optical path intersecting the gas flow path; a light source for emitting light inside the optical path, the light source 14 being installed at one end of the optical path; a first photodetector for detecting a light emitted from the light source as a reference light, the first photodetector being installed at a side of the light source and rearward from a distal end of the light source in a light emitting direction along an optical axis of the light source; a second photodetector for detecting a light emitted from the
(Continued)

light source for measuring light absorption, the second photodetector being installed at another end of the optical path.

8 Claims, 3 Drawing Sheets

(51) Int. Cl.
  *G01N 21/25*   (2006.01)
  *G01N 21/85*   (2006.01)
(52) U.S. Cl.
  CPC ..... *G01N 21/85* (2013.01); *G01N 2021/0389* (2013.01); *G01N 2021/8578* (2013.01); *G01N 2201/0638* (2013.01)
(58) Field of Classification Search
  USPC .......................................................... 356/437
  See application file for complete search history.

(56) References Cited

U.S. PATENT DOCUMENTS

| | | |
|---|---|---|
| 2016/0061704 A1 | 3/2016 | Deguchi et al. |
| 2017/0199117 A1 | 7/2017 | Deguchi et al. |
| 2018/0217053 A1 | 8/2018 | Deguchi et al. |
| 2019/0271636 A1 | 9/2019 | Deguchi et al. |
| 2022/0172969 A1* | 6/2022 | Nagase ............. G01N 21/0303 |

FOREIGN PATENT DOCUMENTS

| | | |
|---|---|---|
| JP | 2002-374039 A | 12/2002 |
| JP | 2007-529012 A | 10/2007 |
| JP | 2018-169203 A | 11/2018 |
| WO | 2014/181527 A1 | 11/2014 |
| WO | 2016/017122 A1 | 2/2016 |
| WO | 2017/029791 A1 | 2/2017 |
| WO | 2018/021311 A1 | 2/2018 |

* cited by examiner

DENSITY MEASUREMENT DEVICE

TECHNICAL FIELD

The present invention relates to a concentration measurement device for measuring a gas concentration based on the principle of the absorptiometric method.

BACKGROUND ART

Conventionally, as this type of concentration measurement device, one is known in which a light of a predetermined wavelength is incident into a measurement cell provided with a gas flow path, an absorbance is measured by detecting a light absorbed by a gas passing through the measurement cell with a light detector, and a concentration of the gas is calculated from the absorbance by applying the Lambert-Beer-law (e.g., Patent Documents 1, 2, 3, etc.).

Further, in order to improve measurement accuracy, a concentration measurement device is also known in which a part of the incident light is branched before being incident into the measurement cell, and is detected as a reference light, and errors in the absorbance calculation values due to deterioration or the like of the incident light are corrected (e.g., Patent Documents 3 and 4, etc.).

FIG. 1 shows an example of a conventional concentration measurement device. A light source 1 includes light emitting elements 1a, 1b of different-wavelengths, lights L1, L2 emitted from the respective light emitting elements 1a, 1b are multiplexed by a half mirror 2a of a multiplexing module 2, sent to a branching module 4 through an optical fiber 3a, and divided by the half mirror 4a of the branching module 4 into a reference light Lr and a light Lm for measuring absorbance. The reference light Lr is detected by a first photodetector 5 for detecting reference light. The light Lm for measuring absorbance is incident into a measurement cell 6 through an optical fiber 3b. In the measurement cell 6, a gas G flows through an inlet 6a and an outlet 6b. The measurement cell 6 is provided with a translucent window 6c at one end side, and a light reflecting film 6d at another end side. In the figure, a reference numeral 7 denotes a ball lens, and a reference numeral 8 denotes an optical fiber connector. The light Lm is incident into the measurement cell 6 through the translucent window 6c and reflected by the light reflecting film 6d, a reflected light Lmb is transmitted through the translucent window 6c again, sent to the branch module 4 through the optical fiber 3b, reflected by the half mirror 4a, and sent to a second photodetector 9. The light Lmb absorbed by the gas G in the measurement cell 6 is detected by the second photodetector 9 of the branching module 4 and used in the calculation of absorbance.

PRIOR-ART DOCUMENT

Patent Documents

Patent literature 1: International Publication No. WO2016/017122 publication brochure.
Patent literature 2: International Publication No. WO2014/181527 publication brochure.
Patent literature 3: International Publication No. WO2018/021311 publication brochure.
Patent literature 4: International Publication No. WO2017/029791 publication brochure.

SUMMARY OF INVENTION

However, in the conventional concentration measurement device, in order to diverge the light from the light source by the branching module before the light is incident into the measurement cell, the light source, the branching module, and the measurement cell are connected by the optical fibers, which is unpreferable because the light is attenuated when passing through the optical fibers. Also, this type of concentration measurement device also demands miniaturization.

Therefore, a main object of the present invention is to provide a miniaturizable concentration measurement device without using an optical fiber.

To achieve the above object, a concentration measurement device according to an aspect of the present invention includes a measurement cell having a gas flow path and an optical path intersecting the gas flow path, a light source for emitting light inside the optical path, the light source being installed at one end of the optical path, a first photodetector for detecting a light emitted from the light source as a reference light, the first photodetector being installed at a side of the light source and rearward from a distal end of the light source in a light emitting direction along an optical axis of the light source, and a second photodetector for detecting a light emitted from the light source for measuring light absorption, the second photodetector being installed at another end of the optical path.

According to one aspect of the present invention, the measurement cell includes a measurement cell body having the gas flow path and a through hole constituting a part of the optical path, and, and an incident side member having the light source and the first photodetector, the incident side member being connected to the measurement cell body through a first translucent window at one opening portion of the through hole. The incident side member includes a first recess, the light source is installed at a bottom of the first recess, and the first photodetector is embedded in a side wall of the first recess.

Further, according to one aspect of the present invention, the first photodetector is fixed to the incident side member, so as to be oriented obliquely with respect to the optical axis of the light source.

Further, according to one aspect of the present invention, the measurement cell includes a detection side member provided with a second photodetector connected to the measurement cell body through a second translucent window at another opening portion of the through hole, the detection side member includes a second recess constituting a part of the optical path together with the through hole, the second photodetector is installed at a bottom of the second recess, the detection side member further includes a condenser lens interposed between the second photodetector and the second translucent window, and the distance between the condenser lens and the light source is 15 mm or less.

Further, according to one aspect of the present invention, the light source includes a plurality of light emitting elements of different wavelengths.

Further, according to one aspect of the present invention, the plurality of light emitting elements includes a light emitting element of wavelength 230 nm-320 nm, and a light emitting element of wavelength 520 nm-680 nm.

Further, according to one aspect of the present invention, each optical axis of the plurality of light emitting elements is directed to the same second photodetector, and each light emitted from the plurality of light emitting elements is received by the second photodetector.

Effect of Invention

According to the present invention, the first photodetector is configured to detect the light of the light source at the side and rear of the light source, so that the distance between the light source and the first photodetector and the gas flow path can be shortened, which makes it possible to miniaturize the measurement cell without using an optical fiber.

DESCRIPTION OF EMBODIMENTS

A first embodiment of the concentration measurement device according to the present invention will be described below with reference to FIGS. 2 and 3.

Figure 2:
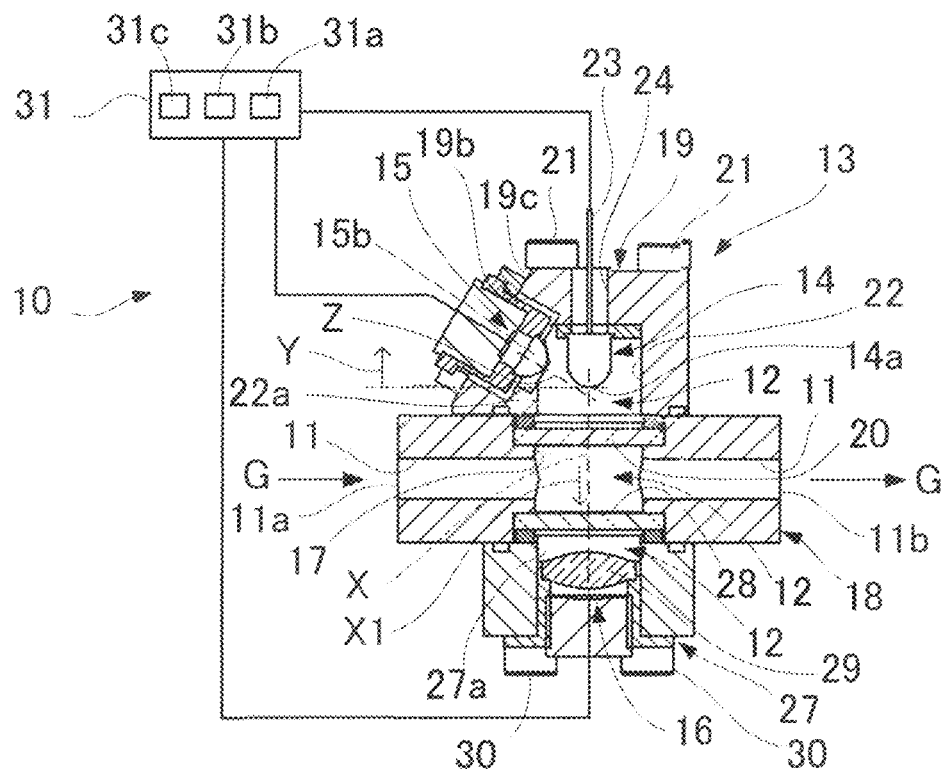
FIG. 2 is a central longitudinal sectional front view showing a first embodiment of a concentration measurement device according to the present invention.
Figure 3:
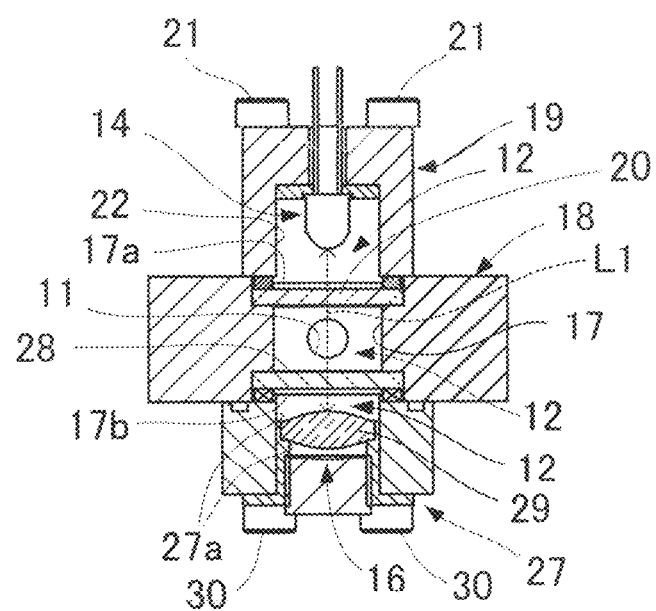
FIG. 3 is a central longitudinal sectional side view of a main part of the concentration measurement device of FIG. 2.

Referring to FIGS. 2 and 3, the concentration measurement device 10 is provided with a measurement cell 13 having a gas flow path 11 and an optical path 12 intersecting the gas flow path 11, a light source 14 for emitting light in the optical path 12, the light source being installed at one end portion of the optical path 12, a first photodetector 15 for detecting a light emitted from the light source 14 as a reference light, the first photodetector being installed at a side of the light source 14 and rearward from a distal end of the light source 14 in a light emitting direction X1 along an optical axis X of the light source 14 (arrow Y direction in FIG. 2), a second photodetector 16 for detecting a light emitted from the light source 14 for measuring light absorption, the second photodetector being installed at another end of the optical path 12.

The measurement cell 13 is provided with a through hole 17 for the optical path 12, a measurement cell body 18 having the gas flow path 11, and an incident side member 19 having the light source 14 and the first photodetector 15. The incident side member 19 is connected to the measurement cell body 18 via a first translucent window 20 at one opening portion 17a of the through hole 17. The incident side member 19 is fixed to the measurement cell body 18 by bolts 21.

The gas flow path 11 has a gas inlet 11a at one end opening, and a gas outlet 11b at another end opening, and passes through the measurement cell body 18 in a straight line in the illustrated embodiment. The measurement cell body 18 is formed of a material having excellent corrosion resistance such as stainless steel. As the first translucent window 20, mechanically and chemically stable sapphire glass is suitably used, but other stable materials such as quartz glass and the like may also be used.

The incident side member 19 is provided with a first recess 22 being optically communicated to the through hole 17 through the first translucent window 20 and constituting a part of the optical path 12. That is, the through hole 17 and the first recess 22 are communicated to allow a light passing through the first translucent window. The light source 14 is installed at the bottom of the first recess 22.

As the light source 14, a light emitting element such as a light emitting diode or a laser diode is preferably used. The light source 14 of the illustrated embodiment is a so called bullet type light emitting diode, in which an encapsulant resin covering the LED element is bullet shaped. A lead wire 23 is drawn from a bottom hole 24 of the incident side member 19. For the first photodetector 15 and the second photodetector 16, an optical sensor such as a photodiode or a phototransistor may be used.

The first photodetector 15 is embedded in a side wall 22a of the first recess 22, preferably embedded in a bottom end portion of the side wall 22a inside of the first recess 22. The first photodetector 15 is fixed to the incident side member 19 so that the optical axis Z of the first photodetector 15 is non-parallel to the optical axis X of the light source 14.

The first photodetector 15 is embedded and fixed into a mounting hole 19b bored obliquely to the incident side member 19. A mounting surface of the incident side member 19 has an inclined surface 19c. The first photodetector 15 is provided with a lens 15b for condensing a light from the light source 14. The lens 15b is arranged so that a part thereof protrudes inwardly from the side wall 22a of the first recess 22.

A detection side member 27 is connected to the measurement cell body 18. The second photodetector 16 is incorporated in the detection side member 27. The detection side member 27 is connected to the measurement cell body 18 via a second translucent window 28 at the other opening portion 17b of the through hole 17. The detection side member 27 is provided with a second recess 27a, and the second photodetector 16 is installed at the bottom of the second recess 27a. A condenser lens 29 is interposed between the second photodetector 16 and the second translucent window 28. A distance L1 between the condenser lens 29 and the light source 14 is preferably 15 mm or less. The second recess 27a is optically communicated with the through hole 17 via the second translucent window 28 and constitutes a part of the optical path 12. The detection side member 27 is fixed to the measurement cell body 18 by bolts 30.

The optical path 12 is constituted by the first recess 22, the first translucent window 20, the through hole 17 intersecting the gas flow path 11, the second translucent window 28, and the second recess 27a having the condenser lens 29. The light emitted from the light source 14 provided in the first recess passes through the first translucent window 20, the through hole 17 intersecting the gas flow path 11, the second translucent window 28, and the condenser lens 29 inside of the second recess 27a, and is detected by the second photodetector 16, while part of the light is detected by the first photodetector 15.

A detection signal detected by the first photodetector 15 and the second photodetector 16 are sent to a controller 31. The controller 31 controls the current supplied to the light source 14 and has a measurement circuit 31a for measuring outputs of the first photodetector 15 and second photodetector 16 as voltages by a known current-voltage converting circuit. The controller 31 may be provided with a data logger 31b for storing a value measured by the measurement circuit 31a, and a computer 31c for calculating a concentration and operating a correction, so that the concentration calculation process and the correction process may be performed on the basis of the value measured by the measurement circuit 31a. The method of calculating gas concentration by applying the Lambert-Beer law and the method of correcting calculation value by using a reference light are known, thus a detailed description thereof will be omitted. The concentration measurement device having the above configuration can provide the following effects.

There is no light attenuation by the optical fiber, because the light source 14 and the first photodetector 15 are directly attached to the measurement cell 13 without using an optical fiber.

Figure 1:
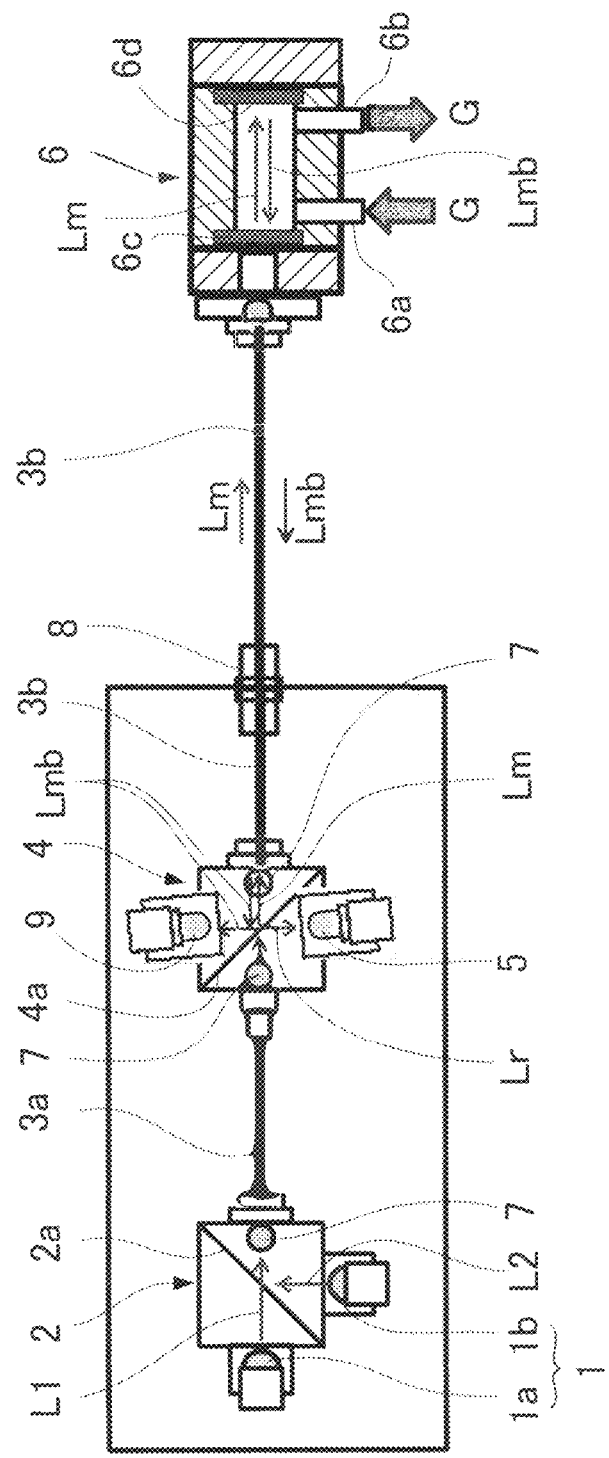
FIG. 1 is a schematic configuration diagram showing a conventional concentration measurement device.

The distance between the light source 14, the first photodetector 15, and the gas flow path 11 can be shortened, and the measurement cell 13 can be miniaturized, because the first photodetector 15 is configured so as to detect the light from the light source 14 from the side and rear (arrow Y direction in FIG. 1) of the light source 14.

The inner space of the first recess 22 for the first photodetector 15 does not expend, because the first photodetector 15 is embedded in the side wall 22a of the first recess 22 of the incident side member 19, thus contributes to the miniaturization of the measurement cell 13.

The light emitting diode constituting the light source 14 generally has a directional angle. Even if the first photodetector 15 is disposed out of the range of the directional angle of the light source 14, light with a certain amount of intensity comes out to the rear of the light source 14 and can be detected as a reference light. Further, the light may also be condensed to the first photodetector 15 by the lens 15b.

The first photodetector 15 is disposed so that an optical axis Z thereof is not parallel to an optical axis X of the light source 14, but oblique with respect to the optical axis X of the light source 14. By the configuration of disposing the first photodetector 15 obliquely, as compared with the case where the first photodetector 15 and the light source 14 are arranged side by side so as to be parallel, the incident side member 19, which is a disposing portion, can be miniaturized, so that the entire measurement cell 13 can be miniaturized because it is not necessary to provide a half mirror.

By the configuration of protruding only a portion of the lens 15b of the first photodetector 15 into the first recess 22, the reference light from the light source 14 can be condensed without expanding the space of the first recess 22 which constitutes a part of the optical path 12, thus the measurement cell 13 can be miniaturized.

In the concentration measurement device according to the first embodiment, the light source 14 configured with a single light emitting element is shown, and the approximate concentration of ozone to be measured is previously known, as the light source 14, a LED device of a wavelength 230 nm-320 nm, for example 300 nm, is used.

Figure 4:
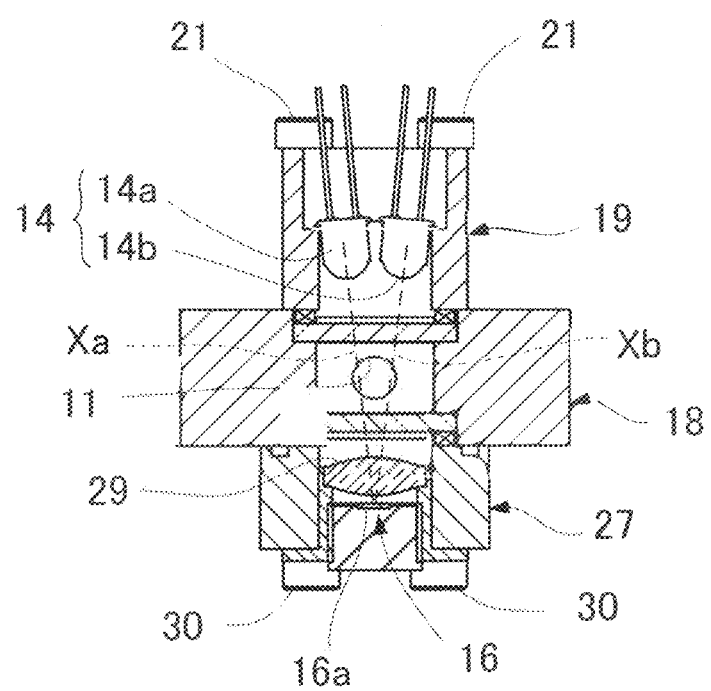
FIG. 4 is a central longitudinal sectional front view showing a second embodiment of the concentration measurement device according to the present invention.

Next, a second embodiment of the concentration measurement device of the present invention will be described below with reference to FIG. 4. The same or similar components as those of the first embodiment are denoted by the same reference numerals. FIG. 4 is a central longitudinal sectional side view and is a cross-sectional view corresponding to FIG. 3 of the first embodiment. The central longitudinal sectional front view of the second embodiment is not shown because it is substantially the same as FIG. 2 of the first embodiment.

Referring to FIG. 4, in the concentration measurement device of the second embodiment, the light source 14 is provided with two light emitting elements 14a, 14b of different wavelengths. Each optical axis Xa, Xb of the light emitting elements 14a, 14b is directed to the center of a single second photodetector 16 (the center of the semiconductor chip 16a), and the lights emitted from the light emitting elements 14a, 14b are configured to be received by the second photodetector 16.

In the illustrated embodiment, one light emitting element 14a of the light source 14 has a wavelength of 230 nm-320 nm, and the other light emitting element 14b has a wavelength of 520 nm-680 nm. These two wavelengths are suitable for measuring the concentration of ozone gas. In other words, the ozone gas has a peak of absorption near 600 nm in a high concentration region and a peak of absorption near 255 nm in a low concentration region. Therefore, by providing light-emitting elements 14a, 14b of 2 types of wavelengths, it is possible to measure the concentration of the ozone gas in the high concentration range and the low concentration range. For the first photodetector 15 and the second photodetector 16, an optical sensor having sensitivity to each wavelength of the light emitting elements 14a, 14b is used respectively. Depending on the properties of the gas to be measured, it is possible to select the wavelength of the light emitting elements 14a, 14b, and three or more light emitting elements of differing wavelengths may be provided.

The present invention is not construed as being limited to the above-mentioned embodiments, and various modifications are possible within a range that does not depart from the spirit of the present invention.

REFERENCE SIGNS LIST

10 Concentration measurement device
11 Gas flow path
12 Optical path
13 Measurement cell
14 Light source
14a, 14b Light emitting element
15 First Photodetector
16 Second Photodetector
17 Through hole
18 Measurement cell body
19 Incident side member
20 First translucent window
22 First recess
22a Side wall
15b Lens
27 Detection side member
27a Second recess
28 Second translucent window
29 Condenser lens

What is claimed is:
1. A concentration measurement device, comprising a measurement cell having a gas flow path and an optical path intersecting the gas flow path, wherein
the measurement cell comprises:
a measurement cell body having a through hole constituting a part of the optical path, and the gas flow path passing therethrough;
a light emitting element for emitting light inside the optical path, the light emitting element being installed at one end of the optical path;
a first light sensor for detecting a light emitted from the light emitting element as a reference light, the first light sensor being installed at a side of the light emitting element and rearward from a distal end of the light emitting element in a light emitting direction along an optical axis of the light emitting element;
an incident side member having the light emitting element and the first light sensor, the incident side member being fixed to the measurement cell body through a first translucent window at one opening portion of the through hole; and
a second light sensor for detecting a light emitted from the light emitting element for measuring light absorption, the second light sensor being installed at another end of the optical path, the incident side member comprises a first recess, the light emitting element is installed at a bottom of the first recess, and the first light sensor is embedded in a side wall of the first recess.

2. The concentration measurement device according to claim 1, wherein:

the measurement cell includes a detection side member provided with the second light sensor, the detection side member being fixed to the measurement cell body through a second translucent window at another opening portion of the through hole;

the detection side member includes a second recess constituting a part of the optical path together with the through hole;

the second light sensor is installed at a bottom of the second recess; and the detection side member further comprises a condenser lens interposed between the second light sensor and the second translucent window.

3. The concentration measurement device according to claim 1, wherein the light emitting element includes a plurality of light emitting elements of different wavelengths.

4. The concentration measurement device according to claim 3, wherein the plurality of light emitting elements includes a light emitting element of wavelength 230 nm~320 nm and a light emitting element of wavelength 520 nm~680 nm.

5. The concentration measurement device according to claim 3, configured so that each optical axis of the plurality of light emitting elements is directed to the second light sensor, and each light emitted from the plurality of light emitting elements is received by the second light sensor.

6. The concentration measurement device according to claim 1, wherein the first light sensor is fixed to the incident side member, so as to be oriented obliquely with respect to the optical axis of the light emitting element.

7. The concentration measurement device according to claim 1, wherein the measurement cell includes a detection side member provided with a second light sensor connected to the measurement cell body through a second translucent window at another opening portion of the through hole;

the detection side member includes a second recess constituting a part of the optical path together with the through hole;

the second light sensor is installed at a bottom of the second recess;

the detection side member further comprises a condenser lens interposed between the second light sensor and the second translucent window; and a distance between the condenser lens and the light emitting element is 15 mm or less.

8. A concentration measurement device, comprising a measurement cell having a gas flow path and an optical path intersecting the gas flow path, wherein the measurement cell comprises:

a light source for emitting light inside the optical path, the light source being installed at one end of the optical path;

a first photodetector for detecting a light emitted from the light source as a reference light, the first photodetector being installed at a side of the light source and rearward from a distal end of the light source in a light emitting direction along an optical axis of the light source;

a second photodetector for detecting a light emitted from the light source for measuring light absorption, the second photodetector being installed at another end of the optical path;

a measurement cell body having the gas flow path and a through hole constituting a part of the optical path; and an incident side member having the light source and the first photodetector, the incident side member being connected to the measurement cell body through a first translucent window at one opening portion of the through hole, the incident side member includes a first recess;

the light source is installed at a bottom of the first recess;

the first photodetector is embedded in a side wall of the first recess;

a detection side member includes a second recess constituting a part of the optical path together with the through hole; the second photodetector being installed at a bottom of the second recess;

the detection side member further comprises a condenser lens interposed between the second photodetector and a second translucent window; and a distance between the condenser lens and the light source is 15 mm or less.

* * * * *